US012775686B2

(12) United States Patent
Modani et al.

(10) Patent No.: US 12,775,686 B2
(45) Date of Patent: Oct. 27, 2026

(54) SMART DEVICE MANAGEMENT RESOURCE PICKER

(71) Applicant: Google LLC, Mountain View, CA (US)

(72) Inventors: Vipul Modani, Mountain View, CA (US); Matthew Marshall, Mountain View, CA (US); Di Zhu, Mountain View, CA (US); Prem Kumar, Mountain View, CA (US)

(73) Assignee: Google LLC, Mountain View, CA (US)

( * ) Notice: Subject to any disclaimer, the term of this patent is extended or adjusted under 35 U.S.C. 154(b) by 150 days.

(21) Appl. No.: 18/317,219

(22) Filed: May 15, 2023

(65) Prior Publication Data

US 2023/0281283 A1 Sep. 7, 2023

Related U.S. Application Data

(63) Continuation of application No. 16/996,332, filed on Aug. 18, 2020, now Pat. No. 11,768,925.

(Continued)

(51) Int. Cl.

*H04L 29/06* (2006.01)
*G06F 9/50* (2006.01)

(Continued)

(52) U.S. Cl.

CPC ............ *G06F 21/31* (2013.01); *G06F 9/5011* (2013.01); *G06F 21/44* (2013.01); *G06F 21/78* (2013.01); *G06F 2221/2141* (2013.01)

(58) Field of Classification Search

CPC ........... G06F 21/31; G06F 21/44; G06F 21/78

See application file for complete search history.

(56) References Cited

U.S. PATENT DOCUMENTS 9,998,453 B1 * 6/2018 Sharma ................. H04L 63/083
2007/0174282 A1 7/2007 Matsuda et al.

(Continued)

FOREIGN PATENT DOCUMENTS

CN 103455520 A 12/2013
EP 2512106 A1 10/2012

(Continued)

OTHER PUBLICATIONS

International Search Report and the Written Opinion for the related Application No. PCT/US2020/046810, Dated Aug. 18, 2020, 177 pages.

(Continued)

*Primary Examiner* — Jason K Gee

(74) *Attorney, Agent, or Firm* — Honigman LLP; Brett A. Krueger

(57) ABSTRACT

A method for a smart device management resource picker includes receiving an authorization request from a third party. The authorization request requests access to a user resource managed by the device manager. The device manager manages access controls associated with a plurality of user devises, the access controls are configured by a user. The method also includes determining whether the third party is authorized to access the user resource managed by the device manager. When the third party is authorized to access the user resource managed by the device manager, the method includes determining whether the user has configured access controls at the device manager that governs the user resource subject to the authorization request. When the user has configured a respective access control that governs the user resource subject to the authorization request, the method includes communicating a response to the authorization request based on the respective access control.

20 Claims, 9 Drawing Sheets

Related U.S. Application Data

(60) Provisional application No. 62/888,962, filed on Aug. 19, 2019.

(51) Int. Cl.
*G06F 21/31* (2013.01)
*G06F 21/44* (2013.01)
*G06F 21/78* (2013.01)

(56) References Cited

U.S. PATENT DOCUMENTS

2009/0164649 A1 6/2009 Kawato
2011/0047590 A1* 2/2011 Carr .................... G06F 21/6218 726/1
2014/0090091 A1* 3/2014 Prakash .............. G06F 21/6245 726/30
2015/0356798 A1* 12/2015 Du ........................... G07C 9/32 340/5.7
2016/0134932 A1 5/2016 Karp et al.
2017/0223057 A1 8/2017 Amiri
2018/0262597 A1 9/2018 Matthieu et al.
2022/0108031 A1* 4/2022 Saini ................... G06F 21/6254

FOREIGN PATENT DOCUMENTS

JP 2007-188184 A 7/2007
JP 2014-174601 A 9/2014

OTHER PUBLICATIONS

CNIPA. Office Action relating to application No. 202080059144.8, dated Dec. 18, 2023.
Office Action issued in related Japanese Application patent application No. 2023-073279, dated May 21, 2024.

* cited by examiner

SMART DEVICE MANAGEMENT RESOURCE PICKER

CROSS REFERENCE TO RELATED APPLICATIONS

This U.S. patent application is a continuation of, and claims priority under 35 U.S.C. § 120 from, U.S. patent application Ser. No. 16/996,332, filed on Aug. 18, 2020 which claims priority under 35 U.S.C. § 119(e) to U.S. Provisional Application 62/888,962, filed on Aug. 19, 2019. The disclosures of these prior applications are considered part of the disclosure of this application and are hereby incorporated by reference in their entities.

TECHNICAL FIELD

This disclosure relates to managing access to smart devices.

BACKGROUND

This section provides background information related to the present disclosure which is not necessarily prior art. Smart home technology uses devices such as linking sensors, features and other appliances connected to the Internet of things (IoT) that can be remotely monitored, controlled, or accessed and provide services that respond to the needs of the users. Smart home technology allows users to control and monitor their connected home devices from Smart home applications, smartphones, or other networked devices. Users can remotely control connected home systems whether they are home or away. This allows for more efficient energy and electric use as well as home security.

SUMMARY

One aspect of the disclosure provides a method for a smart device management resource picker. The method includes receiving, at data processing hardware of a device manager, an authorization request from a third party. The authorization request requests access to a user resource managed by the device manager. The device manager manages access controls associated with a plurality of user devises, the access controls are configured by a user. The method also includes determining, by the data processing hardware, whether the third party is authorized to access the user resource managed by the device manager. When the third party is authorized to access the user resource managed by the device manager, the method includes determining, by the data processing hardware, whether the user has configured access controls at the device manager that governs the user resource subject to the authorization request. When the user has configured a respective access control that governs the user resource subject to the authorization request, the method includes communicating, by the data processing hardware, a response to the authorization request based on the respective access control.

Implementations of the disclosure may include one or more of the following optional features. In some implementations, determining whether the third party is authorized to access the user resource managed by the device manager includes determining that a whitelist authorizes the third party to access a type of resource that includes the user resource. In some examples, the method further includes, when the third party is not authorized to access the user resource managed by the device manager, denying, by the data processing hardware, access to the user resource subject to the authorization request. In some implementations, determining whether the user has configured access controls at the device manager that governs the user resource subject to the authorization request includes determining that the user has not configured access controls that governs the user resource subject to the authorization request and generating a consent request for the user to input one or more access controls in the device manager that govern the authorization request.

In some examples, the device manager includes a user interface. Here, the user interface includes one or more access control selections for the user to configure a respective access control that governs a respective user resource. In these examples, the one or more access control selections may represent the respective user resource in a hierarchy that includes at least two of a third party, a physical structure housing the respective user resource, a user device associated with the respective user resource, or a function associated with the user resource. Optionally, in these examples, the method may also include receiving, at the data processing hardware, an access control selection for the user. In some examples, the method further includes storing, by the data processing hardware, the access control selection as a data structure in an access control list. Here, the data structure may include a tuple represented as an object, a relation, and a user. In some implementations, the user resource includes user data generated by a respective user device of the plurality of user devices managed by the device manager.

Another aspect of the disclosure provides a system for a smart device management resource picker. The system includes data processing hardware and memory hardware in communication with the data processing hardware. The memory hardware stores instructions that when executed on the data processing hardware cause the data processing hardware to perform operations. The operations include receiving an authorization request from a third party. The authorization request requests access to a user resource managed by the device manager. The device manager manages access controls associated with a plurality of user devises, the access controls are configured by a user. The operations also include determining whether the third party is authorized to access the user resource managed by the device manager. When the third party is authorized to access the user resource managed by the device manager, the operations include determining whether the user has configured access controls at the device manager that governs the user resource subject to the authorization request. When the user has configured a respective access control that governs the user resource subject to the authorization request, the operations include communicating a response to the authorization request based on the respective access control.

Implementations of the disclosure may include one or more of the following optional features. In some implementations, determining whether the third party is authorized to access the user resource managed by the device manager includes determining that a whitelist authorizes the third party to access a type of resource that includes the user resource. In some examples, the operations further include, when the third party is not authorized to access the user resource managed by the device manager, denying access to the user resource subject to the authorization request. In some implementations, determining whether the user has configured access controls at the device manager that governs the user resource subject to the authorization request includes determining that the user has not configured access controls that governs the user resource subject to the authorization request and generating a consent request for the user to input one or more access controls in the device manager that govern the authorization request.

In some examples, the device manager includes a user interface. Here, the user interface includes one or more access control selections for the user to configure a respective access control that governs a respective user resource. In these examples, the one or more access control selections represent the respective user resource in a hierarchy that includes at least two of a third party, a physical structure housing the respective user resource, a user device associated with the respective user resource, or a function associated with the user resource. Optionally, in these examples, the operations may also include receiving an access control selection for the user. In some examples, the operations further include storing the access control selection as a data structure in an access control list. Here, the data structure may include a tuple represented as an object, a relation, and a user. In some implementations, the user resource includes user data generated by a respective user device of the plurality of user devices managed by the device manager.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1A:
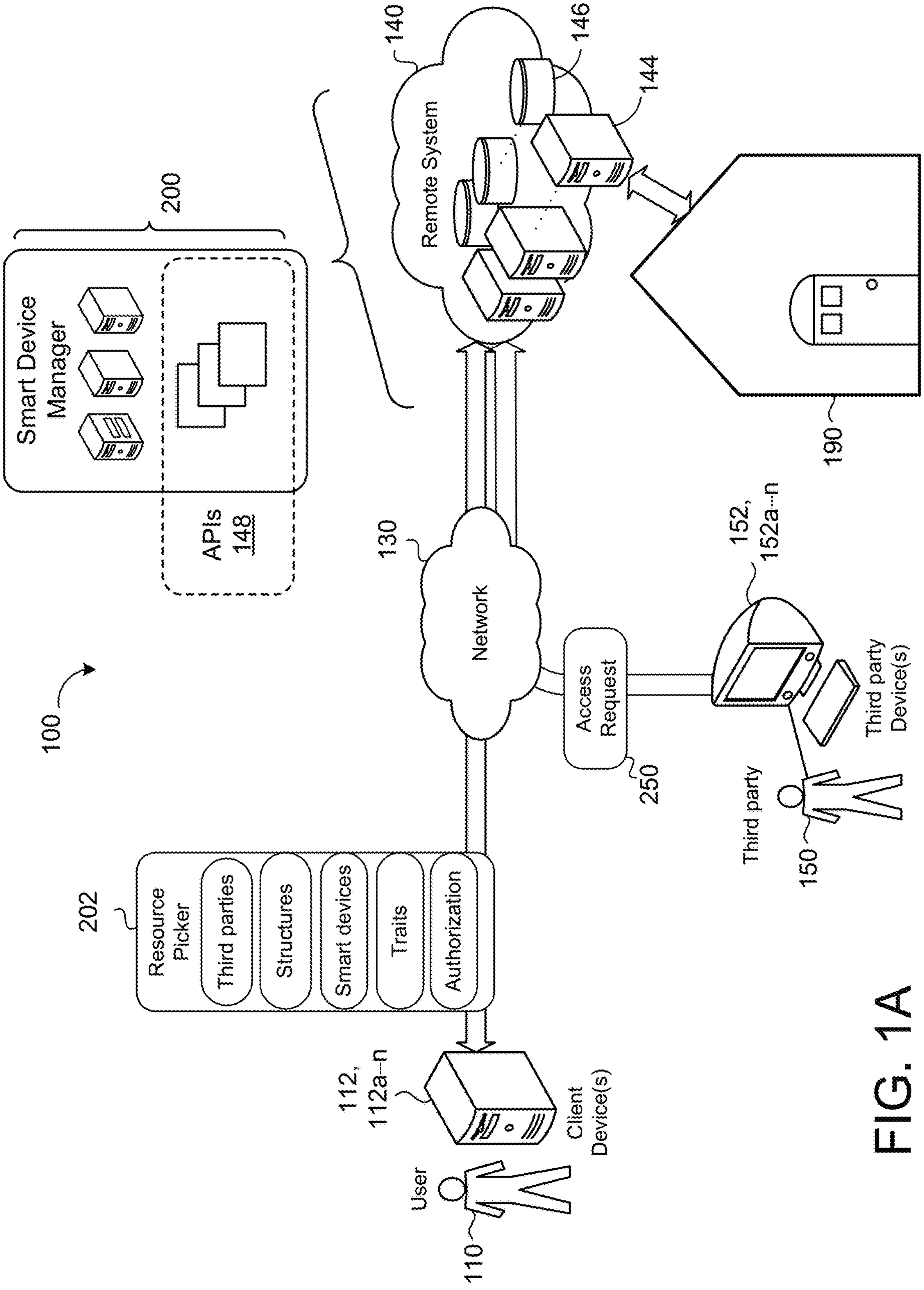
FIG. 1A is a schematic view of an example environment for a smart device manager.
Figure 2A:
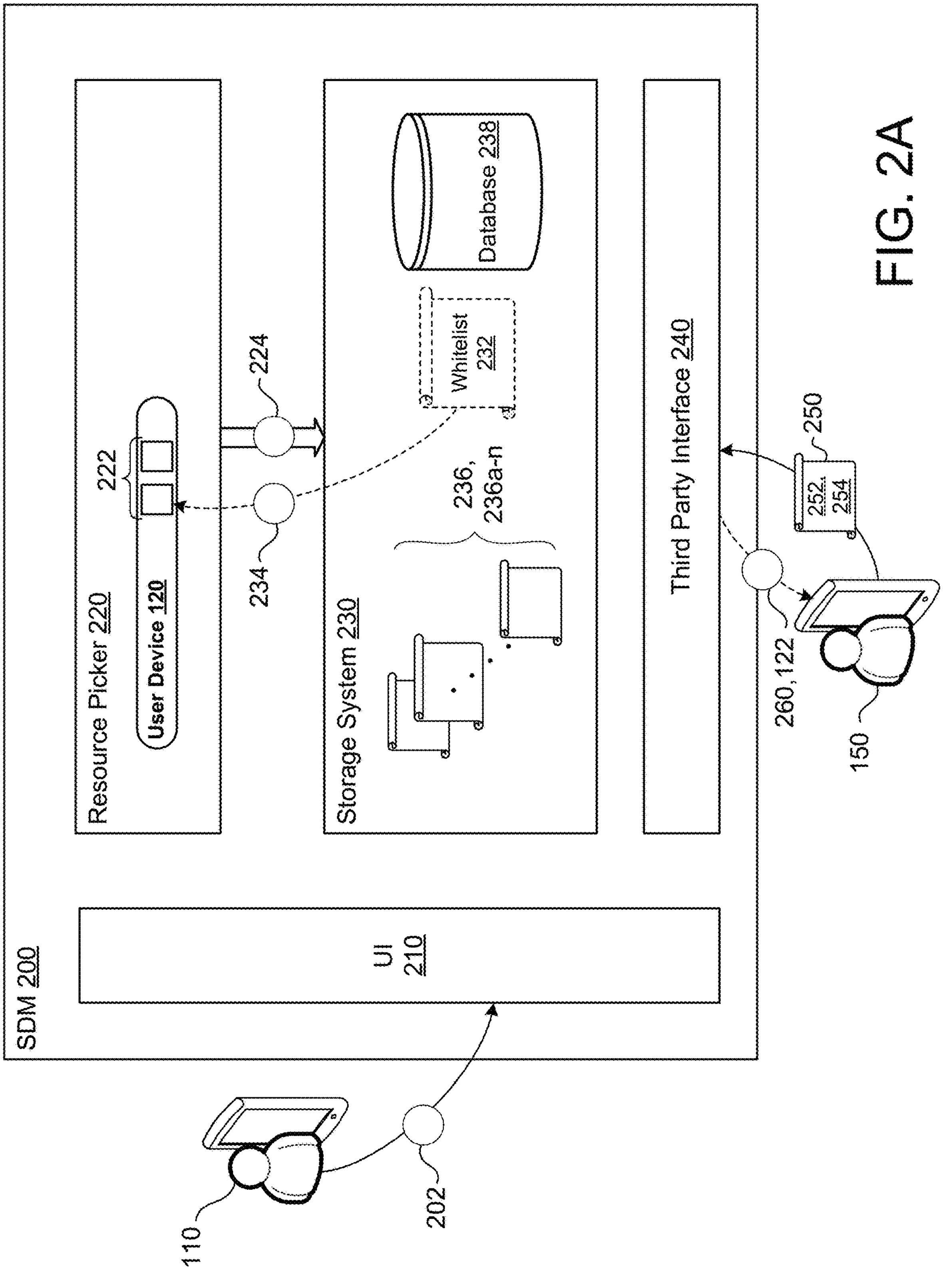
FIG. 2A is a schematic view of an example smart device manager.

FIG. 1A is an example of an environment 100 that manages access to smart devices 120. The environment includes a user 110 interfacing with client devices 112. The client devices 112 are in communication with a remote system 140 via a communications network 130. The remote system 140 may include remote processing devices (e.g., data processing hardware) 144 and remote persistent (non-transitory) storage (e.g., memory hardware) 146. The remote processing devices 144 may execute software that provides application-programming interfaces (APIs) for accessing to smart devices 120. The remote system 140 may execute software that prevents unauthorized access to smart devices 120. A smart device 120 generally refers to sensors, appliances, and other devices connected to a communication network 130. Smart devices 120 may be remotely monitored, controlled, or accessed and may provide services that respond to user 110 needs. Smart devices 120 include thermostats, door locks, lighting dimmers, garage door openers, sprinkler systems, smoke detectors, vacuum cleaners, and home security systems, among other devices. In some examples, smart devices 120 are installed in structures 190, i.e., physical buildings managed by users 110. Structures 190 may be owned or rented by users 110. In an example, the user 110 owns a vacation home 190 that is rented to other users 110 from time to time. In some examples, smart devices 120 register through the communication network 130 with a smart device manager (SDM) 200 (FIG. 2A). The SDM may execute on the remote system 140. The SDM 200 may provide an API for remote monitoring and/or control of the smart device 120. Users 110 may control or monitor smart devices while located away from the structure 190. User devices 120 (i.e., smart devices) may generate user data 122 that may be remotely monitored. In an example, a home security system 120 may generate video data 122 of the interior or exterior of the structure 190. User devices 120 may receive user commands 124 that configure or control devices 120. In an example, a thermostat 120 receives a user command 124 to maintain a temperature of 72° in the structure 190. In some examples, smart devices generate a variety of user data 122 and/or receive and respond to a variety of user commands 124. In an example, a home security system generates data 122 from one or more motion detection systems and receives user commands 124 causing the security system to unlock one or more exterior doors. Each type of user data 122 and each type of user command 124 may be a resource or trait of the smart device 120. In some examples, users 110 manage access to user resources of smart devices 120 via the SDM 200.

Figure 2B:
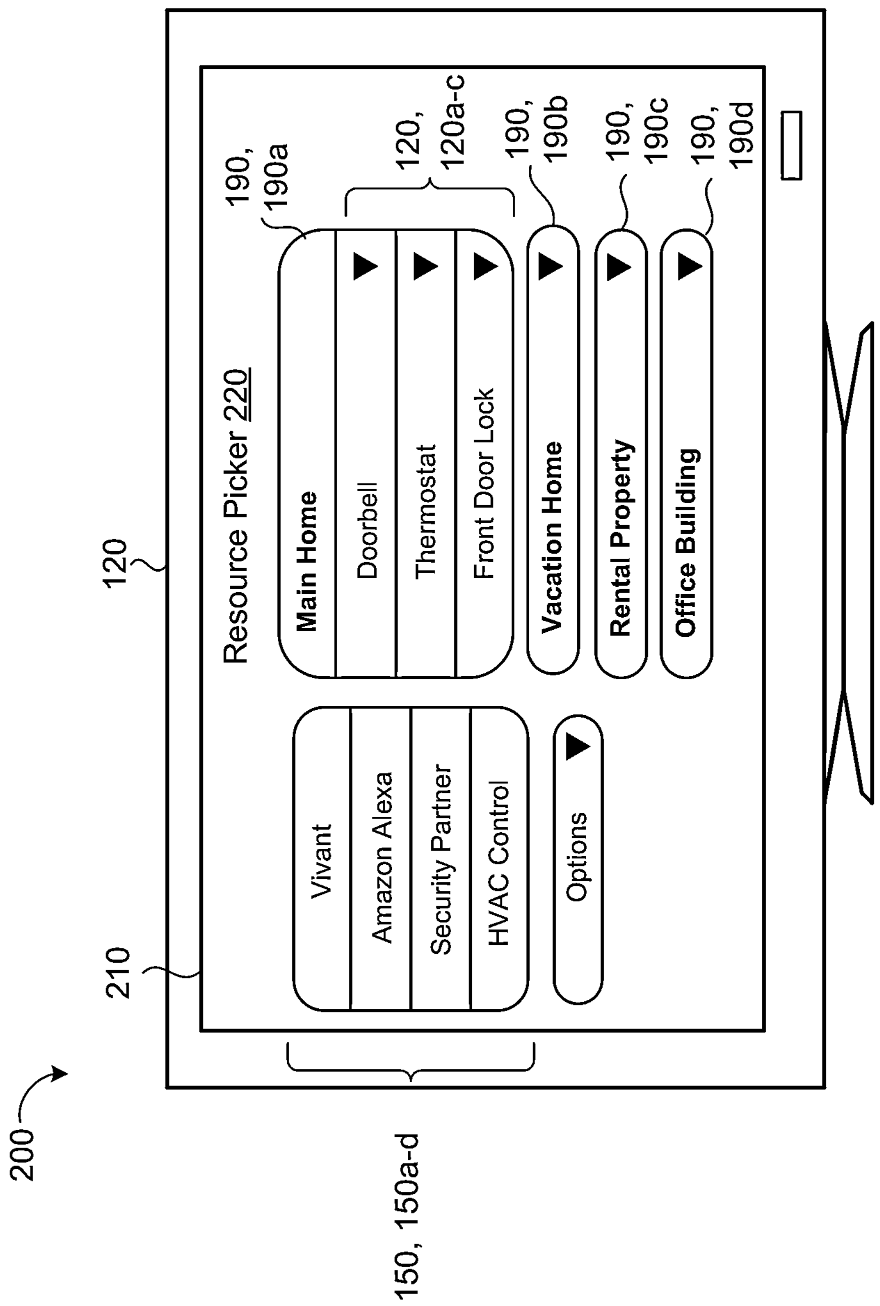
FIGS. 2B and 2C are schematic views of example layouts for a functionality of the smart device manager of FIG. 1A.

As shown in FIG. 1A, a user 110 is located away from the structure 190. In some implementations, the user 110 controls and/or monitors smart devices 120 through the communications network 130 using client devices 112. Client devices 112 may include general-purpose desktop, laptop, mobile computing devices, wearable devices, or special-purpose control and monitoring devices. In some examples, the manufacturer or vendor of the smart device 120 provides a software application for execution on the client device 112 to control or monitor smart devices 120 via the SDM 200. In other examples, third parties 150 control and/or monitors smart devices 120 through the communications network 130 using third-party devices 152. For instance, the software application executing on the client device 112 may interface with third-party devices 152 via the SDM 200, instructing the third-party devices 152 to control or monitor the smart devices 120. The third party 150 may be the manufacturer or vendor of the smart device 120. In an example, the third party 150 provides smart devices 120 that include smart home security systems 120. The third party devices 152 may monitor the status of the smart home security systems 120. The third party 150 may provide a software application to display a status summary of the smart home security system 120 monitored by the third-party devices 152. In some examples, the third party 150 monitors and control devices 120 manufactured or sold by others. In an example, user resources of a smart garage door opener 120 include user commands 124 to open and close the garage door. The third party 150 may monitor the location of the user 110 and transmit a command 124 via the SDM 200, causing the smart garage door opener 120 to open the garage door when the user 110 is within a threshold distance of the structure 190. The SDM 200 may allow authorized third parties 150 to control or monitor smart devices 120 and prevent unauthorized third parties 150 from controlling or monitoring smart devices 120. In some examples, the user authorizes third parties 150 to control or monitor smart devices 120. In some examples, client devices 112 execute a graphical user interface (GUI) 210 in a display 210 (FIGS. 2A and 2B). The GUI 210 may present information to the user 110 to enable the user 110 to authorize specific third parties 150 to access specific user resources of specific smart devices 120 located within specific structures 190. In response to the user 110 performing selections from the GUI 210, the client device 112 may transmit access configuration consent 202 through the communication network to the remote system 140, causing the SDM 200 to process the access configuration consent 202. In some implementations, the third party 150 transmits an access request 250 to the SDM, requesting access to a smart device 120. The SDM may grant or deny the access request 250 based on configuration consents 202 transmitted by the client device 112.

Figure 1B:
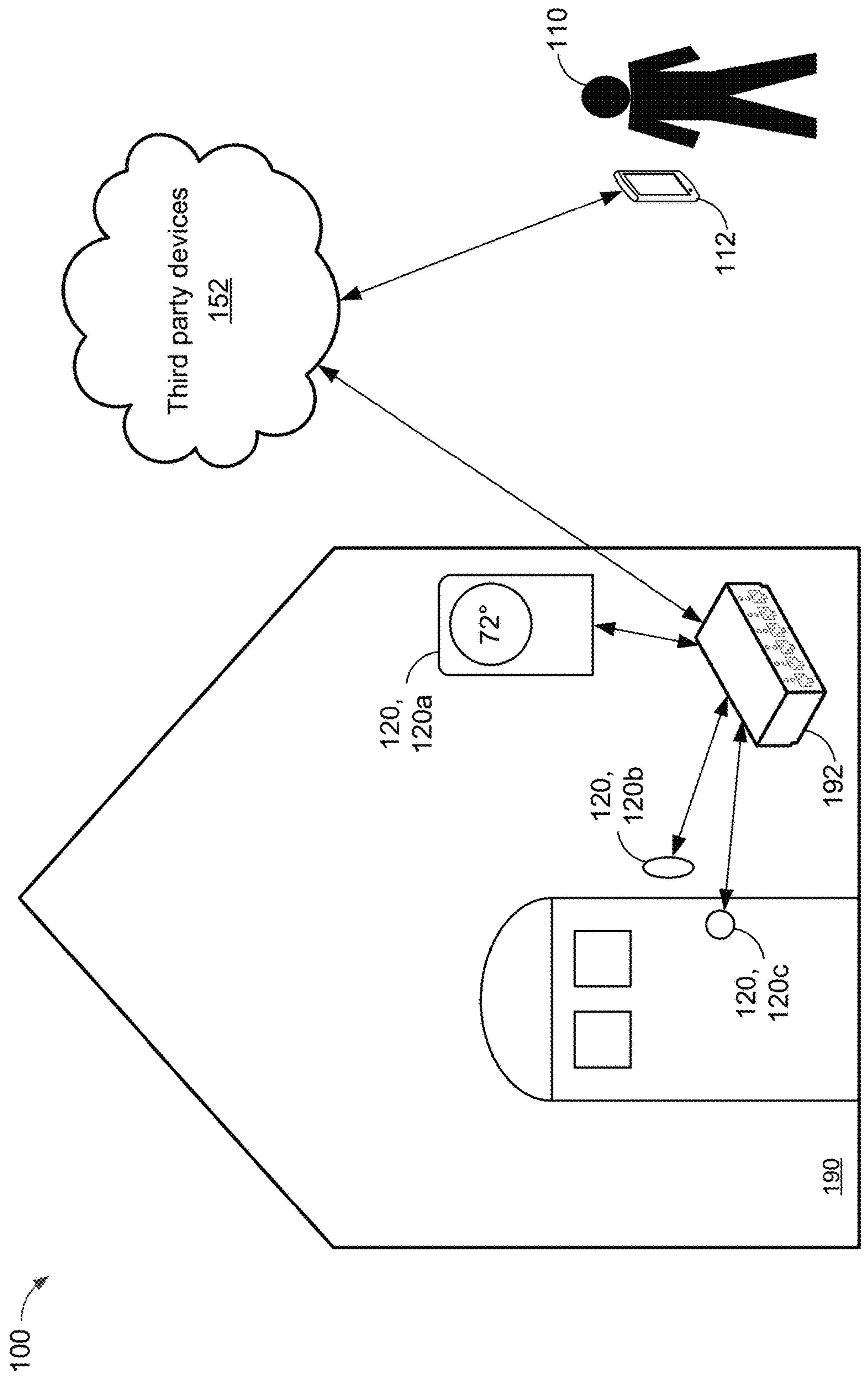
FIG. 1B is a schematic view of an example local ecosystem for a user using the smart device manager of FIG. 1A.

Referring to FIG. 1B, a structure 190 is depicted. The structure 190 includes several smart devices 120. As shown, the structure 190 includes a smart thermostat 120, 120*a*. The smart thermostat 120, 120*a* may generate user data 122 associated with the temperature of the structure 190. The smart thermostat 120, 120*a* may receive user commands 124 associated with a desired temperature to maintain within the structure 190. As shown, the structure 190 also includes a smart doorbell 120, 102*b*, including a camera. The smart doorbell 120, 120*b* may generate streaming video user data 122 or still image user data 122 produced by the camera. As shown, the structure 190 also includes a smart front-door lock 120, 120*c*. The door lock 120, 120*c* may receive user commands 124 associated with locking or unlocking the front door. The door lock 120, 120*c* may generate user data 122 associated with the locked state of the door. In some examples, the user 110 interfaces with a mobile computing device 112. As shown, the mobile computing device 112 interfaces with third party devices 152 to control and monitor the smart devices 120 via the SDM. The SDM 200 may organize the smart devices 120 in a hierarchy based on the location of the smart devices 120 within the structure 190. As shown, the user 110 is the sole resident of the structure 190. The user 110 may unilaterally manage access to smart devices 120 located within the structure 190. In this case, the user 110 may be uniquely identified, e.g., by a password-protected online account. In other examples, multiple users 110 reside at the structure 190. The users 110 may multilaterally manage access to smart devices 120 located within the structure 190. In this case, the users 110 may be identified by separate password-protected online accounts. A majority of users 110 may be required to change or update authorization to control and monitor the smart devices 120 via the SDM. In some examples, a majority of users 110 is required to authorize monitoring smart devices 120 via the SDM and unanimity of users 110 is required to authorize controlling devices 120 via the SDM. In some examples, and user 110 may grant read and/or write access to smart devices 120. Other multilateral management arrangements are possible. Access management responsibility may transfer from a first user 110 to a second user 110. For instance, the first user 110 may transfer ownership of the structure 190 to the second user 110. Transfer of access management responsibility may be temporary, e.g., from a landlord to a tenant of the structure 190. Access management responsibility may transfer from one group of users 110 to another group of users 110, e.g. from one set of tenants to another set of tenants of the structure 190. In some examples, the SDM prevents access to smart devices 120 based on a change in access management responsibility for the structure 190. The users 110 associated with the structure 190 managed by the user 110 may be found by finding the structures 190 the user 110 manages, find the managers for the structures 190 found in the previous step, and find the third parties 150 associated with the managers found in the previous step.

The user 110 and/or one or more third party 150 communicates with an SDM 200. The SDM 200 refers to an application (e.g., software) that coordinates permission and/or access to user data 122. In some examples, the SDM 200 is an application programming interface (API). The SDM 200 may be hosted remotely or locally. For example, the remote system 140 may host the SDM 200 and the user 110 or a third party 150 may access the SDM 200 over a communication channel. For instance, the client device 112 may execute an application configured to access the SDM 200 executing on the remote system 140 (e.g., a browser as the application). In another example, a networked device of the user 110 or the third party 150 hosts a portion or all of the SDM 200 locally such that data processing hardware and/or memory hardware of the networked device (e.g., client device 112) stores and/or executes the SDM 200. In either case, the SDM 200 is configured to authenticate and to authorize a third party 150 (e.g., a third party developer) to particular portions of a user's data 122. In some examples, without authorization (i.e., consent) from the user 110, the SDM 200 grants a third party 150 access to call the SDM 200 with no implications of access to any resources related to the user 110 (i.e., user data 122). Therefore, the SDM 200 serves as both a gateway for a third party 150 to access user data 122 while also serving as a resource access manager for a user 110 to control third party 150 access to user data 122.

In order to perform authentication and/or authorization, the SDM 200 includes a user-facing authorization process where the user 110 configures the accessibility of different types of user data 122 for a third party 150. In other words, the SDM 200 gives a user 110 fine-grained control over user data 122 shared with third parties 150. This allows a user 110 to specify which types of user data 122 to share with third parties 150. During the authentication process, the SDM 200 may allow a user 110 to control user data 122 by different variables. Some of these variables include by operation (i.e., operations to be performed on user data 122 such as read/write), by third party 150, by user device 120, by an environment where the user device 210 resides (e.g., a defined ecosystem or structure 190 associated with a user device 120 such as a building or a room of a building), etc. In some implementations, during the user-facing authorization process, SDM 200 enables the user 110 to communicate consents 202 about user data 122 related to one or more of these variables. Here, a consent 202 refers to a grant of authorization for a particular resource (e.g., user data 122). The consent 202 is therefore able to define fine-grained control by explicitly specifying a degree of access. The degree of access may range from general access to the any user data 122 generated by a user device 120 to more specific access based on different iterations of user data variables (e.g., operation, third party 150, user device 120, structure 190, etc.). For instance, a consent 202 authorizes a particular resource (e.g., user data 122) to be used in a particular manner (e.g., by operation) by a particular entity (e.g., third party 150). With the SDM 200, the user 110 is able to define resource access with greater granularity than simply carte blanche access for a particular third party 150.

In some configurations, when a user 110 decides to use the SDM 200 for access control management, the user 110 generally grants a default consent 202 that a third party 150 associated with the SDM 200 may use the SDM 200 to attempt to access resources with no implications of access to any particular resources. In other words, there may be third parties 150 such as third party developers that are recognized partners of the SDM 200 (e.g., registered/authorized venders for the SDM 200). More specifically, the SDM 200 may maintain relationships with third party developers to develop, to innovate, and/or to provide third party services for smart devices (e.g., user devices 120). When the SDM 200 has such a relationship, the third party 150 may be generally authorized to access the SDM 200 to request access to resources (e.g., user data 122) controlled by the SDM 200.

Referring to FIGS. 2A-2E, the SDM 200 includes a user interface (UI) 210, a resource picker 220, a storage system 230, and a third party interface (3PI) 240. The SDM 200 uses an authentication and authorization procedure to coordinate interactions between a user 110 and one or more third parties 150 regarding user devices 120. In other words, third parties 150 often may need and/or want access to user devices 120 and/or the user data 122 to implement or to develop applications (i.e., software) that are compatible with a user device(s) 120. The SDM 200 is configured to facilitate third party access (or denial of access) to user data 122 on behalf of the user 110. The UI 210 of the SDM 200 generally refers to an interface that is user-facing. For instance, the UI 210 includes a login prompt for the user 110 to enter login credentials (e.g., user name and/or user password) to gain access to the SDM 200 and the user version of its functionality. By having a UI 210 separate from a 3PI 240, the SDM 200 may have different functionality and/or features specific to a user 110 (e.g., at the UI 210) and a third party 150 (e.g., at the 3PI 240). Although FIG. 2A shows the components 210, 220, 230, 240 of the SDM 200 as all integrated modules within the SDM 200, each module may be configured to perform respective functions separate from the functions performed by the other modules.

Figure 2C:
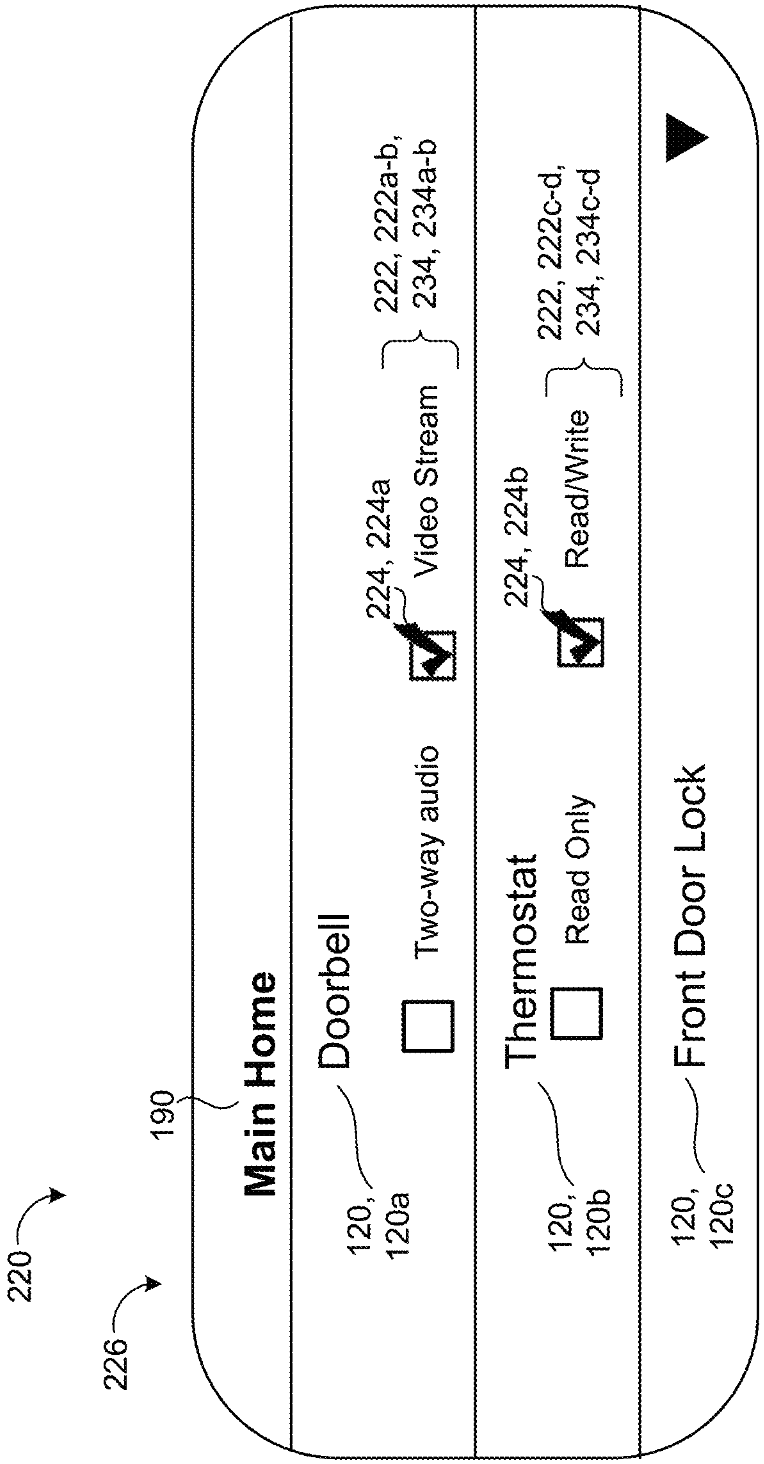

In some examples, the UI 210 is an interface for the user 110 to control the resource picker 220. As an interface to the resource picker 220, the UI 210 is configured to display information related to access control of user resources (e.g., user devices 120 or user data 122 collected by the user devices 120). For example, FIGS. 2B and 2C illustrate example layouts of the UI 210 with selectable features of the resource picker 220. In some implementations, the UI 210 generates the display of the resource picker 220 by interacting with a whitelist 232 of the SDM 200. The whitelist 232 generally refers to a list of specific third parties 150 that the SDM 200 recognizes as partners (e.g., service partners). For instance, the whitelist 232 includes a list of third parties 150 that are registered with the provider of the SDM application. In some implementations, each third party 150 on the whitelist 232 may have a party-specific level of access. In other words, when the third party 150 registers with the SDM 200 or an entity providing the SDM 200, the third party 150 is approved (i.e., authorized) for a certain type of access (e.g., read access, but not write access regarding a type of smart device). In some examples, the type of authorized access depends on the type of smart device(s) and a competency of the third party 150 with that type of smart device(s). For instance, a third party 150 that develops functionality for a smart thermostat would be setup in the whitelist 232 with read and/or write to resources of a smart thermostat, but without access to a resources of a smart doorbell (e.g., shown in FIG. 2C as two-way audio or video streaming). For example, a first third party 150, 150*a* is whitelisted for live streaming and audio clips while a second third party 150, 150*b* is whitelisted for reading a smart thermostat. This approach allows the whitelist 232 to represent that some third parties 150 may have competencies across multiple smart devices while other third parties 150 have competencies limited to a particular resource. In other words, the whitelist 232 allows the SDM 200 to not grant access to user resources that are unrelated to the services of third parties 150; thus, providing user resources with some degree of an initial safeguard from potential abuse by third parties 150.

The resource picker 220 is configured to allow the user 110 to control access to his/her resources (e.g., user data 122). As stated previously, the visualization for the functionality of the resource picker 220 may be displayed to the user 110 using the UI 210. In some examples, the resource picker 220 is configured to only present the user 110 with selectable access controls 222 based on the whitelist 232. In other words, the resource picker 220 presents the user 110 with the whitelisted combination of third parties 150 and the access options 234 already whitelisted for a given third party 150. In some examples, by displaying the selectable access controls 222 as the access options 234 of the whitelist 232, the user 110 is not able to expand control, whether intentionally or unintentionally, for a third party 150 beyond the access options 234 included in the whitelist 232. For example, when the third party 150 is a developer for software related to smart thermostats and has been authorized for access options 234 in the whitelist 232 solely for read or read/write access to a smart thermostat device and no other device access, the user 110 cannot generate an access control at the resource picker 220 to grant the third party 150 access to the video stream of a smart doorbell. Stated differently, the SDM 200 (e.g., by the resource picker 220) maintains course-grained access control while the user 110 may further limit the course-grained access control to make fine-grained access control decisions with the selectable access controls 222. Here, the user 110 inputs an access control selection 224 based on the selectable access controls 222 to indicate an access control decision.

The resource picker 220 is capable of displaying the selectable access controls 222 in various configurations. In some examples, the resource picker 220 displays the selectable access controls 222 in a hierarchy 226. The hierarchy 226 may represent the one or more user resources (e.g., user data 122 or user device 120) as a cascading set of variables associated with the one or more user resources. In some configurations, the resource picker 220 displays the user resources based on a selection of the third party 150 by the user 110. For instance, in FIG. 2B, the user 110 selects one or more third parties 150, 150*a-d* and the resource picker 220 populates selectable access controls 222 (e.g., shown in FIG. 2C) for user resources relating to the one or more third parties 150, 150*a-d*. Here, FIG. 2B illustrates that three user resources (e.g., shown as user devices 120, 120*a-c*) related to the four third parties 150*a-d* have selectable access controls 222. In some implementations, such as FIGS. 2B and 2C, the resource picker 220 displays associations with the user resources. For instance, the three user devices 120, 120*a-c* (e.g., doorbell, thermostat, and front door lock) are shown to be associated with a structure 190. The structure 190 refers to a physical structure that houses the user devices 120 or to which the user devices 120 attach. Here, the resource picker 220 displays four structures 190, 190*a-d* of the user 110 that include user resources (e.g., user devices 120 and/or user data 122).

Additionally or alternative, the resource picker 220 populates selectable access controls 222 for additional user devices or devices that are associated with a structure 190 that a user 110 manages. In other words, the resource picker 220 may link one or more user devices 120 of a first user 110 with a user devices 120 of a second user 110 based on either user 110 identifying a shared relationship, or the SDM 200 determining that the user resources are linked. For example, a security management company controls and/or monitors user devices 120 owned by a user 110. In this example, the SDM 200 permits the security management company to register the user devices 120 of the user 110 in order for the security management company to generate access control selections 224 for the user devices 120. With this type of relationship, the SDM 200 may require the owner of the user device(s) 120 to initially setup the user devices 120 with the SDM 200, but to link the user devices 120 at the SDM 200 to the security management company (e.g., a profile in the SDM 200 associated with the security management company).

In some implementations, the variables corresponding to how the resource picker 220 displays the user resources are defined as traits groups. The SDM 200 or an entity administering the SDM 200 may generate the trait groups. A trait group represents a collection of related traits. Some examples of trait groups are structures 190, rooms that subdivide a structure 190, functionality (e.g., media user devices 120, security user devices 120, appliance user devices 120), network location (e.g., by each network hosting the user devices 120), etc. In some implementations, the SDM 200 includes a trait model that generates trait groups associated with resources that the SDM 200 manages. Additionally or alternatively, the SDM 200 may be customizable such that the user 110 may define the trait groups or generate a hierarchy of trait groups for the resource picker 220 to display (e.g., via the UI 210).

In some configurations, the SDM 200 generates the trait groups and includes the trait groups in the whitelist 232. In other words, the SDM 200 generates the access options 234 for the whitelist 232 at a level of trait group. For instance, FIG. 2C depicts the access options 234 for the user devices 120, 120*a-b* at the structure 190 of "Main Home" as the trait group. In some examples, when the SDM 200 includes one or more trait groups in the whitelist 232, the SDM 200 generates an entry in the whitelist 232 of {trait, resource type, read/write}.

As shown in FIG. 2C, the resource picker 220 may populate each user device 120, 120*a-c* with selectable access controls 222 that corresponds to access options 234 of the whitelist 232. For example, the doorbell 120*a* has two selectable access controls 222, 222*a-b* (shown as two-way audio and video stream) and the thermostat 120*b* has two selectable access controls 222, 222*c-d* (shown as read only and read/write). Here, FIG. 2C illustrates that the user 110 has made an access control selection 224, 224*a-b* for each user device 120*a-b* by selecting the video stream for the doorbell 120*a* and the read/write for the thermostat 120*b*. FIG. 2C also depicts that the hierarchical display may include dropdowns to expand and to collapse selectable access controls 222 for a particular user device 120. For instance, the front door lock 120, 120*c* is shown collapsed with no selectable access controls 222

When the user 110 generates an access control selection 224, the resource picker 220 is configured to communicate the access control selection 224 to the storage system 230. The storage system 230 is configured to store and/or to manage access control lists 236, 236*a-n*. In some examples, the storage system 230 manages and/or stores the whitelist 232 for the SDM 200 as an access control list 236. In some examples, when the user 110 generates an access control selection 224, the resource picker 220 and/or the storage system 230 populates an access control list 236 (e.g., separate from the whitelist 232). In some configurations, the storage system 230 maintains an access control list 236 specific to each user 110 managed by the SDM 200. In other configurations, the storage system 230 maintains a universal access control list 236 that incorporates all access control selections 224 made by one or more users 110 of the SDM 200. In some implementations, when the resource picker 220 receives an access control selection 224 that modifies or updates a previous access control for a user resource, the storage system 230 overwrites the previous entry in the corresponding access control list 236. Because access control lists 236 may be updated and/or modified based on access control selections 224 of a user 110, the storage system 230 may be configured with an activity log that tracks or records storage activity.

In some examples, the storage system 230 stores an access control selection 224 as a tuple. In some implementations, the storage system 230 and/or the resource picker 220 constructs the tuple as an expression of an object, a relation, and a user (object, relation, user). Some examples of a form of the object include (i) "enterprise/<enterprise_id>/structure/<structure_id>:<trait_group>" (ii) "enterprise/<enterprise_id>/structure/<structure_id>/<device_type>:<trait_group>" (iii) "enterprise/<enterprise_id>/structure/<structure_id>/<device_type>/<device_id>:<trait_group>:<trait_group>." Here, the relation is an entity that writes the access control selection 224 (e.g., as opposed to the real-world owner of the user resource). The user refers to a user identifier (UID) associated with the user 110. The storage system 230 may be configured as a simple or a complex access control list model where a simple access control list model refers to a model that cannot write multiple objects atomically. Although the storage system 230 may be a simple access control list model, it may be beneficial to the SDM 200 for the storage system 230 to be a complex access control list model because the user 110 may update or may make multiple access control selections 224 at one time.

In some configurations, the storage system 230 also includes a database 238 that indicates when integration (e.g., of user resources) with a third party 150 is enabled. For example, the database 238 generates a Boolean flag to indicate when integration for user resource(s) with a third party 150 is enabled. Although integration with a third party 150 is possible, the SDM 200 may be configured to disable a particular third party's integration ability to avoid abuse. With the SDM 200 dictating integration control, integration may be enabled and disabled for particular events (e.g., on launch dates).

The 3PI 240 generally refers to an interface used by third parties 150 to generate an authorization request 250. An authorization request 250 is a request to grant a third party 150 access to specific resources such as resources (e.g., user data 122) associated with the user 110. When the user 110 responds with a consent 202 to the authorization request 250, the SDM 200 generates an access token 260 for the third party 150 based on the consent 202. In other words, the access token 260 communicates the type of access that the user 110 specifically grants to the third party 150 based on the consent 202 and allows the third party 150 to gain access to resources associated with the user 110. Here, the authorization request 250 may be access to a user device 120 generally or to particular operations of the user device 120. More specifically, the request 250 may designate specific resources (e.g., user data 122) associated with the device 120 (e.g., user data 122 generated by the user device 120 during operation of the user device 120). To illustrate, when the user device 120 is a security system, the third party 150 may request access to video feeds (i.e., the user data 122) generated by the security system.

In some examples, the authorization request 250 includes a user identifier (UID) 252 to identify to the SDM 200 which user 110 the third party 150 is requesting to access. In some implementations, the user 110 has already configured access controls for the third party 150 at the UI 210 of the SDM 200. In these implementations, the SDM 200 may automatically generate consents 202 on behalf of the user 110 based on the configured access controls put in place by the user 110. In some configurations, the authorization request 250 includes a uniform resource identifier (URI) 254 that is configured to redirect the user 110 to the UI 210 to designate access controls for the particular third party 150 or resource being requested by the third party 150. For instance, the authorization request 250 generates a message or communication to the user 110 (e.g., via the SDM 200) requesting that the user 110 designates access controls that will govern the authorization request 250 by the third party 150. The user 110 may use the URI 254 within the authorization request 250 to be prompted to make access control selections dictating the type of access that will be granted (or denied) to the third party 150 of the authorization request 250. When the controls that will govern the authorization request 250 are setup, the SDM 200 or the user 110 via the SDM 200 will respond to the authorization request 250 (e.g., with a consent 202 or a denial of a consent 202). Here, the authorization request 250 allows user data sharing preferences to be in place before a third party 150 receives an access token 260. As explained previously, a third party 150 that skips generating an authorization request 250 may be authorized to interface with the SDM 200, but will not have access to user data 122.

In some implementations, the user 110 revokes the access token 260 for a specific third party 150. When the user 110 revokes the access token 260 for the third party 150, the storage system 230 may persist the existing access control selection(s) 224 related to the third party 150. In other examples, when the user 110 revokes the access token 260 for the third party 150, the SDM 200 informs the storage system 230 to remove access control selection(s) 224 related to the third party-user pair. In either case, cleaning up an inactive third party-user pair will not be detrimental to the SDM 200 because if the third party 150 with revoked access generates a new authentication request 250, the user 110 (e.g., by the URI 254) will be prompted to make access control selections dictating the type of access for the third party 150. Additionally or alternatively, the storage system 230 may be configured to cleanup user data 122 upon request of the user 110. For instance, the storage system 230 removes the user 110 from access control lists 236 of the storage system 230.

Figure 2D:
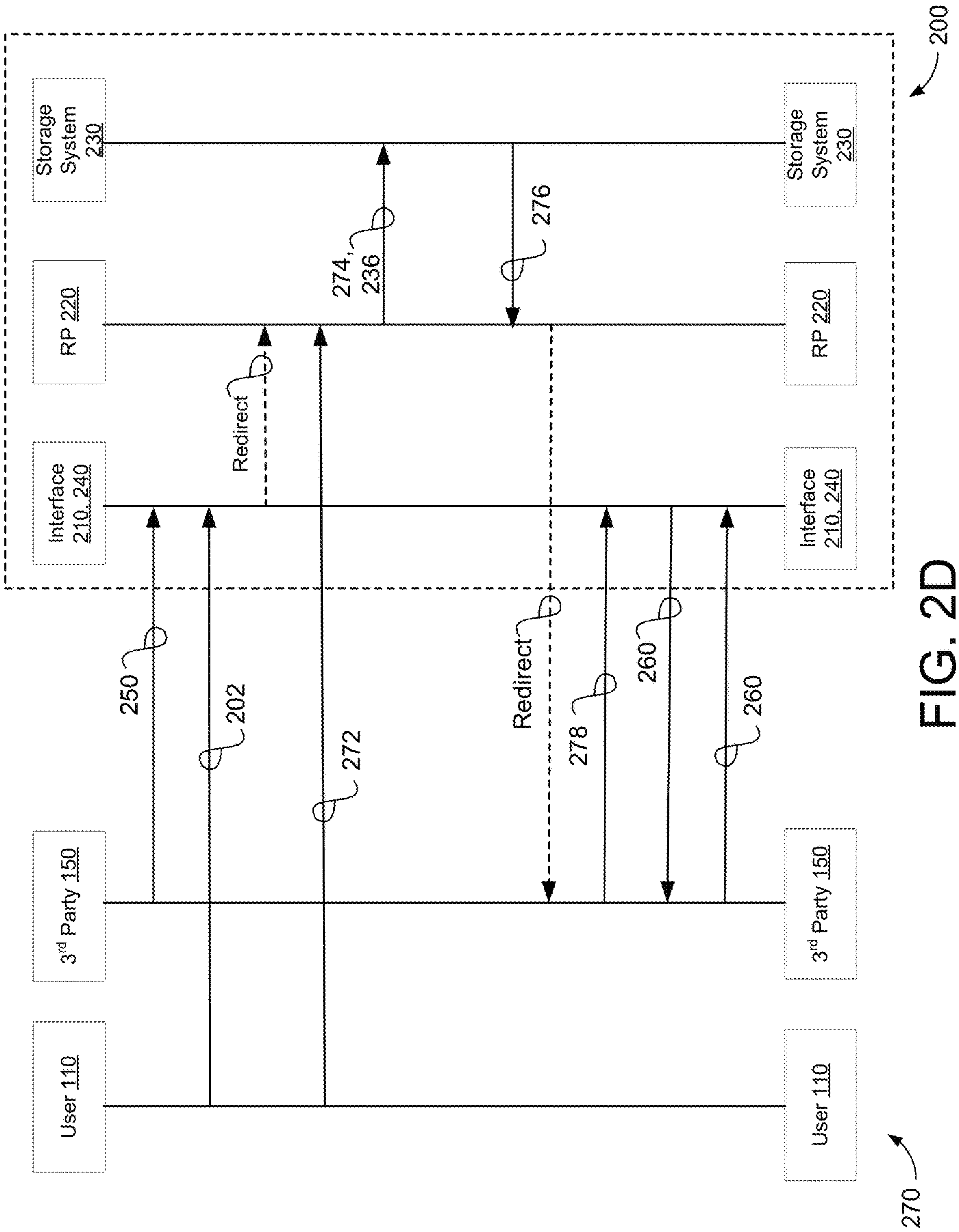
FIGS. 2D and 2E are flow diagrams of example interactions between a user, a third party, and a smart device manager.

FIG. 2D is an example of an authorization process 270 between the user 110, the third party 150, and the SDM 200. In this example, the third party 150 initiates an authorization request 250 at the 3PI 240. Based on the authorization request 250, the user 110 logs into the UI 210 and generates a consent 202 to respond to the authorization request 250. Here, when the user 110 logs into the UI 210, the SDM 200 redirects the user 110 (e.g., with an authorization code) to the resource picker 220. When redirected to the resource picker 220, at operation 272, the user 110 manages fine-grained access to the user resources associated with the authorization request 250. For instance, the user 110 generates access control selection(s) 224 related to the third party 150. At operation 274, the resource picker 220 communicates the access control selection(s) 224 to update or to initially generate at least one access control list 236 at the storage system 230. Once the storage system 230 updates or generates the at least one access control list 236, at operation 276, the storage system 230 communicates that the update or the generation of the access control list 236 is complete. The SDM 200 (e.g., shown as a redirect via the resource picker 230) informs the third party 150 that the authorization request 250 is either granted or denied. At operation 278, when the authorization request 250 is granted, the SDM 200 (e.g., through the 3PI 240) communicates a code that the third party 150 uses to receive the access token 260. The third party 150 then communicates the access token 260 to the 3PI 240 to communicate with the SDM 200 and to access one or more user resources associated with the authorization request 250.

Figure 2E:
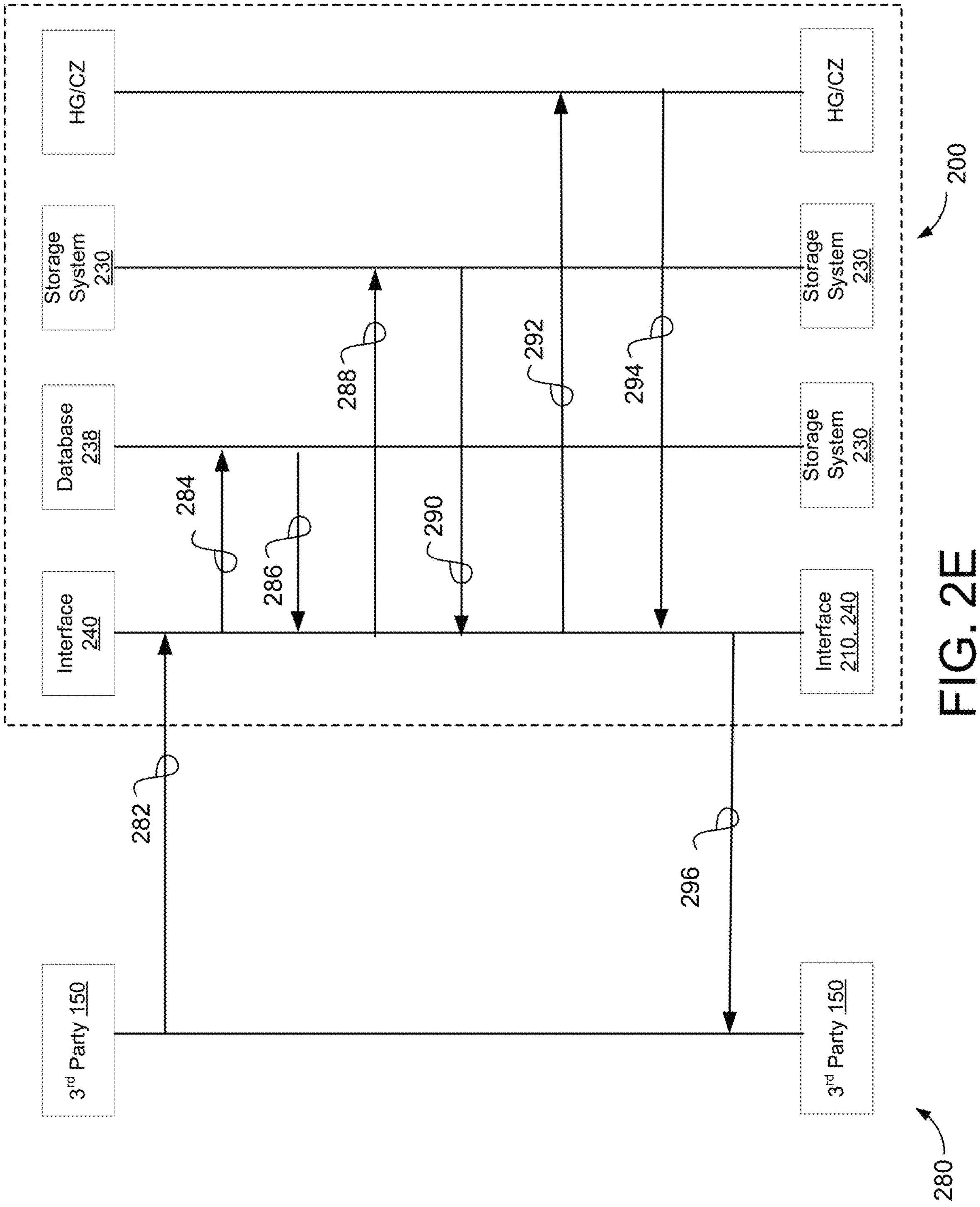

Referring to FIG. 2E, in some implementations, the third party 150 that calls the SDM 200 with an authorization request 250 (e.g., a getdevice request) is an enterprise (e.g., attempting to perform integration of the user resource(s)). At operation 282, the third party 150 communicates a getdevice request with an authentication token 260 at the 3PI 240. Based on the getdevice request, at operation 284, the 3PI 240 communicates with the database 238 to confirm the third party 150 associated with the getdevice request. At operation 286, the SDM 200 confirms that the database 238 includes the third party 150 and authorizes the SDM 200 to either retrieve the third party's permission in the storage system 230 or to allow the third party 150 access to the storage system 230 to retrieve the third party's permissions with respect to user resources identified by the authorization request 250 (as shown in operation 288). Between operation 286 and operation 288, if the integration for the third party 150 with the request is disabled, the SDM 200 may provide an exception for the request or deny the request based on the disabled state. At operation 290, the SDM 200 internally confirms that the third party has third party permissions (access controls for user resource(s)) based on communication with the storage system 230. Here, although not shown, the 3PI 240 may confirm to the third party 150 that the third party 150 has third party permissions. At operation 292, the SDM 200 then communicates with the HG/CZ (e.g., with the 3PI 240) to get information regarding the user device 120 of the getdevice request and, at operation 292, the SDM 200 receives information regarding the user device 120 of the getdevice request from the HG/CZ. Here, between or during operations 292 and 294, the SDM 200 may communicate an error or an unauthorized message when the third party 150 has an authorization token 260 that does not authenticate the third party 150 of the getdevice request as a manager of subject user device 120. At operation 296, the 3PI 240 communicates to the third party 150 responds to the getdevice request with information about the user device 120.

Figure 3:
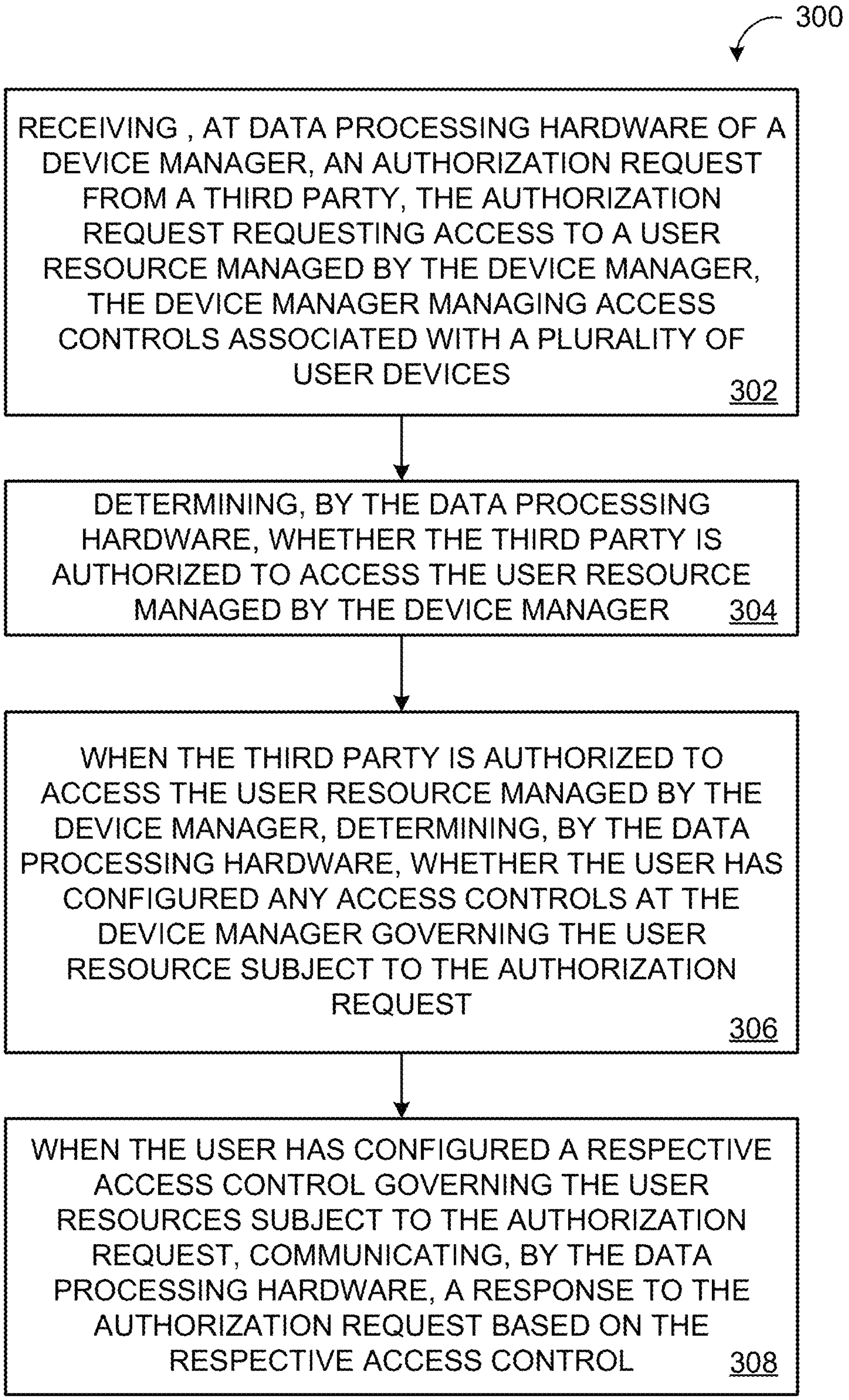
FIG. 3 is an example arrangement of operations to govern user resource control with a smart device manager.

FIG. 3 is a flowchart of an example method 300. The flowchart starts at operation 302 when the method 300 includes receiving, at data processing hardware 410 of a device manager 200, an authorization request 250 from a third party 150, the authorization request 250 requesting access to a user resource managed by the device manager 200, the device manager 200 managing access controls 222 associated with a plurality of user devices 120. At operation 304, the method 300 includes determining, by the data processing hardware 410, whether the third party 150 is authorized to access the user resource managed by the device manager 200. At operation 306, the method 300 includes when the third party 150 is authorized to access the user resource managed by the device manager 200, determining, by the data processing hardware 410, whether the user 110 has configured any access controls 222 at the device manager 200 governing the user resource subject to the authorization request 250. At operation 308, the method 300 includes when the user 110 has configured a respective access control 222 governing the user resources subject to the authorization request 250, communicating, by the data processing hardware 410, a response to the authorization request 250 based on the respective access control 222.

Figure 4:
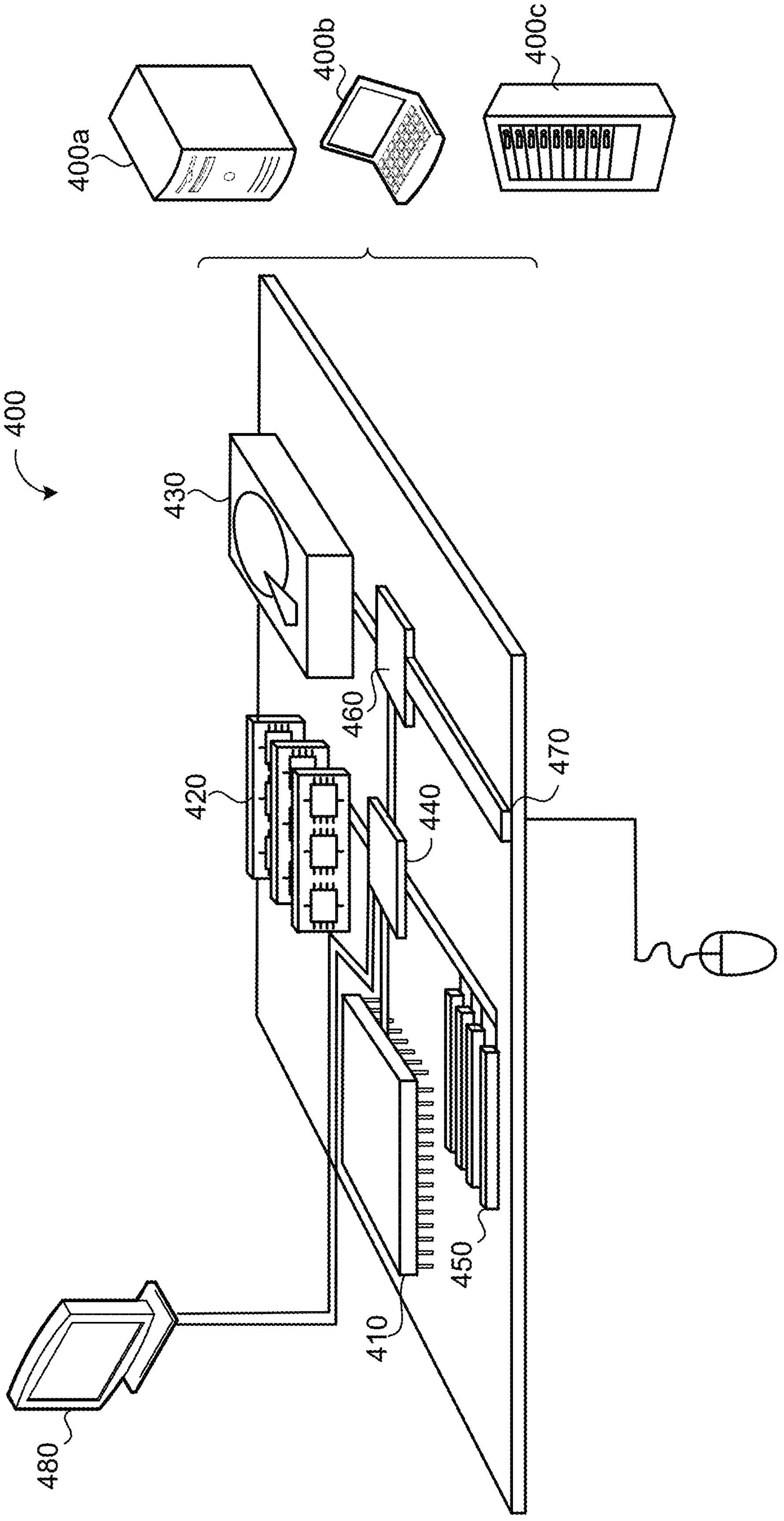
FIG. 4 is a schematic view of an exemplary computing device.

FIG. 4 is schematic view of an example computing device 400 that may be used to implement the systems (e.g., the SDM 200) and methods (e.g., the method 300) described in this document. The computing device 400 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations described and/or claimed in this document.

The computing device 400 includes a processor 410 (also referred to as data processing hardware), memory 420 (also referred to as memory hardware), a storage device 430, a high-speed interface/controller 440 connecting to the memory 420 and high-speed expansion ports 450, and a low speed interface/controller 460 connecting to a low speed bus 470 and a storage device 430. Each of the components 410, 420, 430, 440, 450, and 460, are interconnected using various busses, and may be mounted on a common motherboard or in other manners as appropriate. The processor 410 can process instructions for execution within the computing device 400, including instructions stored in the memory 420 or on the storage device 430 to display graphical information for a graphical user interface (GUI) on an external input/output device, such as display 480 coupled to high speed interface 440. In other implementations, multiple processors and/or multiple buses may be used, as appropriate, along with multiple memories and types of memory. Also, multiple computing devices 400 may be connected, with each device providing portions of the necessary operations (e.g., as a server bank, a group of blade servers, or a multi-processor system).

The memory 420 stores information non-transitorily within the computing device 400. The memory 420 may be a computer-readable medium, a volatile memory unit(s), or non-volatile memory unit(s). The non-transitory memory 420 may be physical devices used to store programs (e.g., sequences of instructions) or data (e.g., program state information) on a temporary or permanent basis for use by the computing device 400. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 430 is capable of providing mass storage for the computing device 400. In some implementations, the storage device 430 is a computer-readable medium. In various different implementations, the storage device 430 may be a floppy disk device, a hard disk device, an optical disk device, or a tape device, a flash memory or other similar solid-state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 420, the storage device 430, or memory on processor 410.

The high-speed controller 440 manages bandwidth-intensive operations for the computing device 400, while the low speed controller 460 manages lower bandwidth-intensive operations. Such allocation of duties is exemplary only. In some implementations, the high-speed controller 440 is coupled to the memory 420, the display 480 (e.g., through a graphics processor or accelerator), and to the high-speed expansion ports 450, which may accept various expansion cards (not shown). In some implementations, the low-speed controller 460 is coupled to the storage device 430 and a low-speed expansion port 490. The low-speed expansion port 490, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 400*a* or multiple times in a group of such servers 400*a*, as a laptop computer 400*b*, or as part of a rack server system 400*c*.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method executed by data processing hardware of a device manager that causes the data processing hardware to perform operations comprising:

receiving an authorization request from a third party, the authorization request requesting access to a user resource managed by the device manager, the device manager managing access controls associated with a plurality of user devices, the access controls configured by a user;

determining that the user has not configured access controls for the third party at the device manager governing the user resource subject to the authorization request;

after determining that the user has not configured the access controls for the third party, transmitting, to the user, a consent request for the user to update the access controls for the third party at the device manager;

receiving an indication that the access controls for the third party at the device manager are updated; and communicating, to the third party, a denial to the authorization request based on the access controls for the third party and a current association of a respective user device of the plurality of user devices with a specific network location defined by the access controls.

2. The method of claim 1, wherein the operations further comprise determining that a second third party is authorized to access the user resource managed by the device manager based on an identity of the second third party.

3. The method of claim 2, wherein determining that the second third party is authorized to access the user resource managed by the device manager based on the identity of the second third party comprises determining that a whitelist authorizes the second third party to access a type of resource comprising the user resource.

4. The method of claim 1, wherein the operations further comprise denying access to the user resource by the third party.

5. The method of claim 1, wherein the device manager comprises a user interface, the user interface comprising one or more access control selections for the user to configure the access controls governing the user resource.

6. The method of claim 5, wherein the one or more access control selections represent the user resource in a hierarchy, the hierarchy comprising at least two of:

a third party selection;

a physical structure housing the user resource;

a respective user device associated with the user resource; or a function associated with the user resource.

7. The method of claim 5, further comprising receiving an access control selection for the user resource.

8. The method of claim 7, further comprising storing the access control selection as a data structure in an access control list.

9. The method of claim 8, wherein the data structure comprises a tuple represented as:

an object;

a relation; and a user identification associated with the user.

10. The method of claim 1, wherein the user resource comprises user data generated by a respective user device of the plurality of user devices managed by the device manager.

11. A system comprising:

data processing hardware of a device manager; and memory hardware in communication with the data processing hardware, the memory hardware storing instructions that when executed on the data processing hardware cause the data processing hardware to perform operations comprising:

receiving an authorization request from a third party, the authorization request requesting access to a user resource managed by the device manager, the device manager managing access controls associated with a plurality of user devices, the access controls configured by a user;

determining that the user has not configured access controls for the third party at the device manager governing the user resource subject to the authorization request;

after determining that the user has not configured the access controls for the third party, transmitting, to the user, a consent request for the user to update the access controls for the third party at the device manager;

receiving an indication that the access controls for the third party at the device manager are updated; and communicating, to the third party, a denial to the authorization request based on the access controls for the third party and a current association of a respective user device of the plurality of user devices with a specific network location defined by the access controls.

12. The system of claim 11, wherein the operations further comprise determining that a second third party is authorized to access the user resource managed by the device manager based on an identity of the second third party.

13. The system of claim 12, wherein determining that the second third party is authorized to access the user resource managed by the device manager based on the identity of the second third party comprises determining that a whitelist authorizes the second third party to access a type of resource comprising the user resource.

14. The system of claim 11, wherein the operations further comprise denying access to the user resource by the third party.

15. The system of claim 11, wherein the device manager comprises a user interface, the user interface comprising one or more access control selections for the user to configure the access controls governing the user resource.

16. The system of claim 15, wherein the one or more access control selections represent the user resource in a hierarchy, the hierarchy comprising at least two of:

a third party selection;

a physical structure housing the user resource;

a respective user device associated with the user resource; or a function associated with the user resource.

17. The system of claim 15, further comprising receiving an access control selection for the user resource.

18. The system of claim 17, further comprising storing the access control selection as a data structure in an access control list.

19. The system of claim 18, wherein the data structure comprises a tuple represented as:

an object;

a relation; and a user identification associated with the user.

20. The system of claim 11, wherein the user resource comprises user data generated by a respective user device of the plurality of user devices managed by the device manager.

* * * * *